(12) United States Patent
Nathanson

(10) Patent No.: US 12,375,893 B2
(45) Date of Patent: *Jul. 29, 2025

(54) SYSTEM FOR AUTHENTICATING AND AUTHORIZING ACCESS TO AND ACCOUNTING FOR WIRELESS ACCESS VEHICULAR ENVIRONMENT CONSUMPTION BY CLIENT DEVICES

(71) Applicant: PAXGRID CDN INC., Ottawa (CA)

(72) Inventor: Martin D. Nathanson, Westmount (CA)

(73) Assignee: PAXGRID CDN INC., Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/378,947

(22) Filed: Oct. 11, 2023

(65) Prior Publication Data

US 2024/0040350 A1 Feb. 1, 2024

Related U.S. Application Data

(60) Division of application No. 17/832,071, filed on Jun. 3, 2022, now Pat. No. 11,812,349, which is a division
(Continued)

(51) Int. Cl.
*H04W 4/24* (2024.01)
*G06F 21/45* (2013.01)
(Continued)

(52) U.S. Cl.
CPC .............. *H04W 4/44* (2018.02); *H04W 4/24* (2013.01); *H04W 12/02* (2013.01); *H04W 12/03* (2021.01);
(Continued)

(58) Field of Classification Search
CPC ......... G06F 9/54–548; G06F 21/30–45; G08B 25/01–10; H04L 9/001–50; H04L 41/28;
(Continued)

(56) References Cited

U.S. PATENT DOCUMENTS

| | | | |
|---|---|---|---|
| 2,292,387 A | 8/1942 | Markey et al. | |
| 4,188,618 A | 2/1980 | Weisbart | |

(Continued)

FOREIGN PATENT DOCUMENTS

| | | |
|---|---|---|
| EP | 0292811 A2 | 11/1988 |
| EP | 0615391 A1 | 9/1994 |

(Continued)

OTHER PUBLICATIONS

Notice of Allowance dated Jul. 13, 2023, from U.S. Appl. No. 17/832,071, 18 sheets.
(Continued)

*Primary Examiner* — Timothy J Weidner
(74) *Attorney, Agent, or Firm* — KATTEN MUCHIN ROSENMAN LLP

(57) ABSTRACT

A system and method are disclosed for authenticating and authorizing access to and accounting for consumption of bandwidth for IPv6 connectivity to the Internet over Wireless Access Vehicular Environment (WAVE) service channels by client devices using an Authentication, Authorization and Accounting (AAA) server. The AAA server authenticates and authorizes client devices to access WAVE service channels, and accounts for bandwidth consumption by the client devices using WAVE service channels to access the Internet. The AAA server enables an RSU infrastructure operator to quantify wireless bandwidth consumption by in-vehicle devices using the WAVE Service Channels, on a per-device basis.

3 Claims, 7 Drawing Sheets

Related U.S. Application Data of application No. 16/581,016, filed on Sep. 24, 2019, now abandoned, which is a continuation of application No. 16/253,861, filed on Jan. 22, 2019, now abandoned, which is a continuation of application No. 15/639,022, filed on Jun. 30, 2017, now Pat. No. 10,187,767.

(60) Provisional application No. 62/357,504, filed on Jul. 1, 2016.

(51) Int. Cl.
| | |
|---|---|
| *H04L 9/40* | (2022.01) |
| *H04L 43/0811* | (2022.01) |
| *H04L 61/5092* | (2022.01) |
| *H04L 67/12* | (2022.01) |
| *H04W 4/44* | (2018.01) |
| *H04W 12/02* | (2009.01) |
| *H04W 12/03* | (2021.01) |
| *H04W 12/06* | (2021.01) |
| *H04W 12/069* | (2021.01) |
| *H04W 12/084* | (2021.01) |
| *H04W 12/086* | (2021.01) |
| *H04W 80/04* | (2009.01) |
| *H04W 84/00* | (2009.01) |
| *H04W 88/02* | (2009.01) |
| *H04W 88/08* | (2009.01) |
| *H04W 88/14* | (2009.01) |
| *H04W 92/02* | (2009.01) |
| *H04W 92/04* | (2009.01) |
| *H04W 92/10* | (2009.01) |
| *H04L 101/659* | (2022.01) |

(52) U.S. Cl.
CPC ....... *H04W 12/068* (2021.01); *H04W 12/069* (2021.01); *H04W 12/084* (2021.01); *H04W 12/086* (2021.01); *G06F 21/45* (2013.01); *H04L 43/0811* (2013.01); *H04L 61/5092* (2022.05); *H04L 63/08* (2013.01); *H04L 63/0823* (2013.01); *H04L 63/0892* (2013.01); *H04L 67/12* (2013.01); *H04L 2101/659* (2022.05); *H04L 2209/80* (2013.01); *H04L 2209/84* (2013.01); *H04W 80/04* (2013.01); *H04W 84/005* (2013.01); *H04W 88/02* (2013.01); *H04W 88/08* (2013.01); *H04W 88/14* (2013.01); *H04W 92/02* (2013.01); *H04W 92/045* (2013.01); *H04W 92/10* (2013.01)

(58) Field of Classification Search
CPC ......... H04L 43/02–55; H04L 61/09–59; H04L 63/02–308; H04L 67/12–125; H04L 69/16–329; H04L 2101/659; H04L 2209/80–84; H04L 2212/00; H04W 4/24–90; H04W 12/009–80; H04W 24/02–10; H04W 28/06–26; H04W 48/02–20; H04W 60/005–06; H04W 76/10–50; H04W 80/02–12; H04W 84/005–22; H04W 88/005–188; H04W 92/02–24

See application file for complete search history.

(56) References Cited

U.S. PATENT DOCUMENTS

| | | |
|---|---|---|
| 4,804,937 A | 2/1989 | Barbiaux et al. |
| 4,831,539 A | 5/1989 | Hagenbuch |
| 4,922,443 A | 5/1990 | Coelsier et al. |
| 4,939,652 A | 7/1990 | Steiner |
| 4,967,390 A | 10/1990 | Rendina et al. |
| 4,999,833 A | 3/1991 | Lee |
| 5,073,900 A | 12/1991 | Mallinckrodt |
| 5,177,464 A | 1/1993 | Hamburg |
| 5,223,844 A | 6/1993 | Mansell et al. |
| 5,371,780 A | 12/1994 | Amitay |
| 5,400,018 A | 3/1995 | Scholl et al. |
| 5,444,643 A | 8/1995 | Haussler et al. |
| 5,497,508 A | 3/1996 | George |
| 5,532,702 A | 7/1996 | Mintz |
| 5,535,274 A | 7/1996 | Braitberg et al. |
| 5,546,444 A | 8/1996 | Roach, Jr. et al. |
| 5,557,268 A | 9/1996 | Hughes et al. |
| 5,594,425 A | 1/1997 | Ladner et al. |
| 5,619,412 A | 4/1997 | Hapka |
| 5,629,942 A | 5/1997 | Zijderhand |
| 5,668,880 A | 9/1997 | Alajajian |
| 5,717,737 A | 2/1998 | Doviak et al. |
| 5,732,074 A | 3/1998 | Spaur et al. |
| 5,768,531 A | 6/1998 | Lin |
| 5,802,502 A | 9/1998 | Gell et al. |
| 5,815,071 A | 9/1998 | Doyle |
| 5,844,473 A | 12/1998 | Kaman |
| 5,854,985 A | 12/1998 | Sainton et al. |
| 5,886,988 A | 3/1999 | Yun et al. |
| 5,897,605 A | 4/1999 | Kohli et al. |
| 5,905,859 A | 5/1999 | Holloway et al. |
| 5,961,561 A | 10/1999 | Wakefield, II |
| 5,999,179 A | 12/1999 | Kekic et al. |
| 5,999,978 A | 12/1999 | Angal et al. |
| 6,028,537 A | 2/2000 | Suman et al. |
| 6,073,089 A | 6/2000 | Baker et al. |
| 6,122,514 A | 9/2000 | Spaur et al. |
| 6,122,664 A | 9/2000 | Boukobza et al. |
| 6,127,947 A | 10/2000 | Uchida et al. |
| 6,181,994 B1 | 1/2001 | Colson et al. |
| 6,208,948 B1 | 3/2001 | Klingler et al. |
| 6,246,955 B1 | 6/2001 | Nishikawa et al. |
| 6,249,232 B1 | 6/2001 | Tamura et al. |
| 6,249,731 B1 | 6/2001 | Miller et al. |
| 6,253,122 B1 | 6/2001 | Razavi et al. |
| 6,286,040 B1 | 9/2001 | Durham et al. |
| 6,295,492 B1 | 9/2001 | Lang et al. |
| 6,330,446 B1 | 12/2001 | Mori |
| 6,330,499 B1 | 12/2001 | Chou et al. |
| 6,343,205 B1 | 1/2002 | Threadgill et al. |
| 6,360,257 B1 | 3/2002 | Rydberg et al. |
| 6,362,730 B2 | 3/2002 | Razavi et al. |
| 6,370,449 B1 | 4/2002 | Razavi et al. |
| 6,397,149 B1 | 5/2002 | Hashimoto |
| 6,405,111 B2 | 6/2002 | Rogers et al. |
| 6,437,743 B1 | 8/2002 | Mintz et al. |
| 6,445,308 B1 | 9/2002 | Koike |
| 6,487,717 B1 | 11/2002 | Brunemann et al. |
| 6,507,810 B2 | 1/2003 | Razavi et al. |
| 6,535,493 B1 | 3/2003 | Lee et al. |
| 6,542,799 B2 | 4/2003 | Mizutani et al. |
| 6,587,781 B2 | 7/2003 | Feldman et al. |
| 6,662,099 B2 | 12/2003 | Knaian et al. |
| 6,730,449 B2 | 5/2004 | Toyama |
| 6,754,183 B1 | 6/2004 | Razavi et al. |
| 6,857,013 B2 | 2/2005 | Ramberg et al. |
| 6,975,612 B1 | 12/2005 | Razavi et al. |
| 7,027,773 B1 | 4/2006 | McMillin |
| 7,593,999 B2 | 9/2009 | Nathanson |
| 7,653,394 B2 | 1/2010 | McMillin |
| 8,560,609 B2 | 10/2013 | Nathanson |
| 9,633,562 B2 | 4/2017 | Nathanson |
| 10,187,767 B2 | 1/2019 | Nathanson |
| 2010/0220738 A1 | 9/2010 | Sarikaya |
| 2012/0159170 A1* | 6/2012 | Lee ............ H04W 12/02 |
| 2014/0195102 A1* | 7/2014 | Nathanson ............ H04W 4/44 |
| 2015/0262198 A1 | 9/2015 | Bai et al. |
| 2017/0289119 A1 | 10/2017 | Lauer |

(56) References Cited

U.S. PATENT DOCUMENTS

| | | | |
|---|---|---|---|
| 2021/0058396 A1 | 2/2021 | Nathanson | |
| 2023/0370460 A1* | 11/2023 | Nathanson | H04W 4/44 |

FOREIGN PATENT DOCUMENTS

| | | | |
|---|---|---|---|
| EP | 0701337 A2 | 3/1996 | |
| EP | 0801354 A2 | 10/1997 | |
| GB | 2263376 A | 7/1993 | |
| WO | 9009645 A1 | 8/1990 | |
| WO | 9628947 A1 | 9/1996 | |
| WO | 9829975 A2 | 7/1998 | |
| WO | 9858512 A1 | 12/1998 | |
| WO | 9914897 A2 | 3/1999 | |
| WO | 9922497 A1 | 5/1999 | |

OTHER PUBLICATIONS

Ex Parte Quayle Action dated Apr. 14, 2023, from U.S. Appl. No. 17/832,071, 35 sheets.
Requirement for Restriction/Election dated Dec. 20, 2022, from U.S. Appl. No. 17/832,071, 9 sheets.
Non-Final Rejection dated Mar. 3, 2022, from U.S. Appl. No. 16/581,016, 32 sheets.
Notice of Allowance dated Sep. 13, 2018, from U.S. Appl. No. 15/639,022, 38 sheets.
Coronado, E.S. et al., "Service Discovery and Service Access in Wireless Vehicular Networks", GLOBECOM Workshops, 2008 IEEE [Online], Dec. 4, 2008.
"IEEE Guide for Wireless Access in Vehicular Environments (WAVE) Architecture", IEEE Std 1609.0-2013 [Online], Mar. 5, 2014.
International Search Report and Written Opinion for PCT/IB2017/053981 dated Nov. 8, 2017; 10 pages.
"CellPort Labs Announces AutoServer.TM.-Gateway to the Internet", CellPort Labs, Inc.—Press Release, News and Events, for release on Monday, Apr. 27, 1998, 2 pages.
"Mobile Internet Connectivity", CellPort Labs, Inc.—C/P Connect, System Overview, Copyright 1998.
A. Acharya, et al., "Mobility Management in Wireless ATM Networks," IEEE Communications Magazine, Nov. 1997, pp. 100-109.
Aoki et al., "Inter-vehicle communication: technical issues on vehicle control application", IEEE Communications Magazine, 1996.
C. Perkins, "Mobile IP", IEEE Communications Magazine, May 1997, pp. 84-99.
DaimlerChrysler IT Cruiser Telematics Concept, DaimlerChrysler Corporation, Auburn Hills, Michigan, Jan. 2001, pp. 1-11.
E. Foster, "The "repo man" could turn off your software in the age of UCITA licenses", InfoWorld, Framingham, Dec. 6, 1999, 2 pages.
Eskafi et al.. "Dynamic channel allocation for vehicle-to-vehicle communications in automated highway systems", IEEE Conference on Intelligent Transportion System, 1997.
Examination Report for EP 01 975 915.8, dated Aug. 14, 2008.
Examiner's Report for Canadian Patent application No. 2,414,126, dated Oct. 23, 2008.
Fujii et al., "Inter-Vehicle communications protocol for group cooperative driving". Vehicular Technology conference, 11999.
H. Zhu et al., "Security in Service-Oriented Vehicular Networks." Service-Oriented Broadband Wireless Network Architecture, IEEE Wireless Communications, Aug. 2009.
Hendrick et al., "Integrated Maneuvering Control Design and Experiments, Report for Phase III", California Path ResearchReport, 1997.
Hsu et al., "Design of Platoon Manuevers for IVHS", American Control Conference, 1991.
Hsu etal., "Communication Requirements and Network Design for IVHS", Insitute of Transportation Studies, 1993.
Inoue et al., "MAC protocol for inter-vehicle communication network using spread spectrum technique", Vehicle Navigation and Information Systems Conference, 1994.
International Search Report with a date of mailing of Feb. 24, 1999 for PCT/CA 98/00986, with an International Filing Date of Oct. 23, 1998.
International Search Report with a date of mailing of Oct. 23, 2002 for PCT/CA 01/01420, with an international Filing Date of Oct. 15, 2001.
J. Betser, et al., "SNMP/MBD Hybrid Network Management", IEEE/IFIP NOMS'96-Network Operations and Management Symposium, Kyoto, Japan, Apr. 1996, pp. 186-199.
J. Case et al., "RFC 1157, A Simple Network Management Protocol", IETF, www.jeff.org, May 1990, 36 pages.
J. Case et al., "RFC 1905, Protocol Operations for SNMPV2", IETF, www.ietf.org, Jan. 1996, 24 pages.
J. Glas, "The Principles of Spread Spectrum Communication", Spread Spectrum Technologies, Last Modified on Aug. 29, 1996, 7 pages.
J. K. Hedrick, Y. Chen, and S. Mahal; "Optimized vehicle control communication interaction in an automated highway system", California Partners for Advanced Transit and Highways (PATH). Research Reports: Paper UCB-ITS-PRR-2001-29., 2001.
Jörg Widmer, "Network simulations for a mobile network architecture for vehicles", Technical Report TR-00-009, International Computer Science Institute (ICSI), May 2000.
Jun Zhu and Paul Wadzinske, "SNMP Secure Forwarder". Motorola: Technical Developments, pp. 69-70. Mar. 1998.
Kim et al., "R-ALOHA Protocol for SS Inter-Vehicle Communication Network Using Head Spacing Information", IEEE Proceedings of the Intelligent Vehicle Symposium, 1996.
LaMaire, et al., "Wireless LANs and Mobile Networking: Standards and Futuredirections", IEEE Xplore AbstractPlus, INSPEC Accession No. 5371881, posted online Aug. 6, 2002, 2 pages. (This papers appears in Communications Magazine, IEEE, Publication Date: Aug. 1996, vol. 34, Issue 8, on pp. 86-94.).
Lee, et al., "A JAVA-Based Wireless Network Management System", IEEE Xplore AbstractPlus, INSPEC Accession No. 5985055, posted online Aug. 6, 2002, 1 page. (This paper appears in Personal Wireless Communications, 1997 IEEE International Conference, Publication Date: Dec. 17-19, 1997, on pp. 353-356.).
Li, Wei-Yi, "Design and Implementation of Digital Radio Communications Link for Platoon Control Experiments", Research Reports, Califomia Partners for Advanced Transit and Highways (PATH), Institute of Transportation Studies, UC Berkeley, 1995.
Lindsey, A.E.; Viswanath, P.B.: "Design, verification and failure diganosis of wireless communication protocols for the AHS," Intelligent Transportation System, 1997. ITSC m'97., IEEE Conference, pp. 52-57, Nov. 9-12, 1997.
M. Lee, et al., "A JAVA-Based Wireless Network Management System", IEEE, ICPWC'97. Dec. 17-19, 1997, pp. 353-356.
Office Action for Japanese Patent Application No. 2000-518484, dispatched on Oct. 15, 2008.
P. Bhagwat, et al., "Network Layer Mobility. An Architecture and Survey", IEEE Personal Communications, Jun. 1996, pp. 54-64.
Polydoros et al., "In teg rated-Layer Packet Radio Study for AHS", Personal, Indoor and Mobile Radio Communications, 1995. PIMRC'95. 'Wireless: Merging onto the Information Superhighway'., Sixth IEEE International Symposium on, 1995.
R LaMaire, et al , "Wireless LANs and Mobile Networking: Standards and Future Directions", IEEE Communications Magazine, Aug. 1996, pp. 86-94.
R. Roberts, "Spread Spectrum Printer", Spread Spectrum Scene Online SS Primer Page—Introductory Info and Links, Updated Aug. 5, 1998, 6 pages.
Rokitansky, Carl-Herbert, "Performance analysis and Simulation of Vehicle-Beacon Communication Protocols", IEEE Vehicular Technology Conference, 1992.
Sachs et al., "A Communication System for the Control of Automated Vehicles", California PATH Technical Memorandum 93-5, 1993.

(56) References Cited

OTHER PUBLICATIONS

Sakaguchi et al., "Inter-vehicle Communications for Merging Control", Proceedings of the IEEE International Vehicle Electronics Conference, 1999.
Stallings, "Security Comes to SNMP: The New SNMPv3 Proposed Internet Standards," The Internet Protocol Journal, vol. 1, No. 3, Dec. 1998.
Streisand et al., "A Communication Architecture for IVHS", Research Reports. California Partners for Advanced Transit and Highways (PATI-I), Institute of Transportation Studies, UC Berkeley, 1992.
Tabbane et al., "R-BTMA: A MAC Protocol for Short-Range Mobile Radio Communications", Ecole Nationale Superieure des Telecommunications, 1990.
Varaiya, P.; "Smart cars on smart roads: problems of control," Automatic Control, IEEE Transactions, vol. 38, No. 2, pp. 195-207, Feb. 1993.
Varaiya, Pravin, "An Object Oriented Database for IV-IS", California PATH Program, Jan. 1998.
Varaiya, Pravin, "Smart Cars on Smart Roads: Problems of Control", IEEE Transactions on Automatic Control, vol. 38, No. 2, Feb. 1993.
Verdone, R., "Multihop R-ALOHA for intervehicle communications at millimeter waves", IEEE Transactions on Vehicular Technology, Volumn 46, 1997.
Yashiro et al., "A Network Based on Inter-vehicle Communication", Intelligent Vehicles Symposium, 1993.

\* cited by examiner

Figure 1
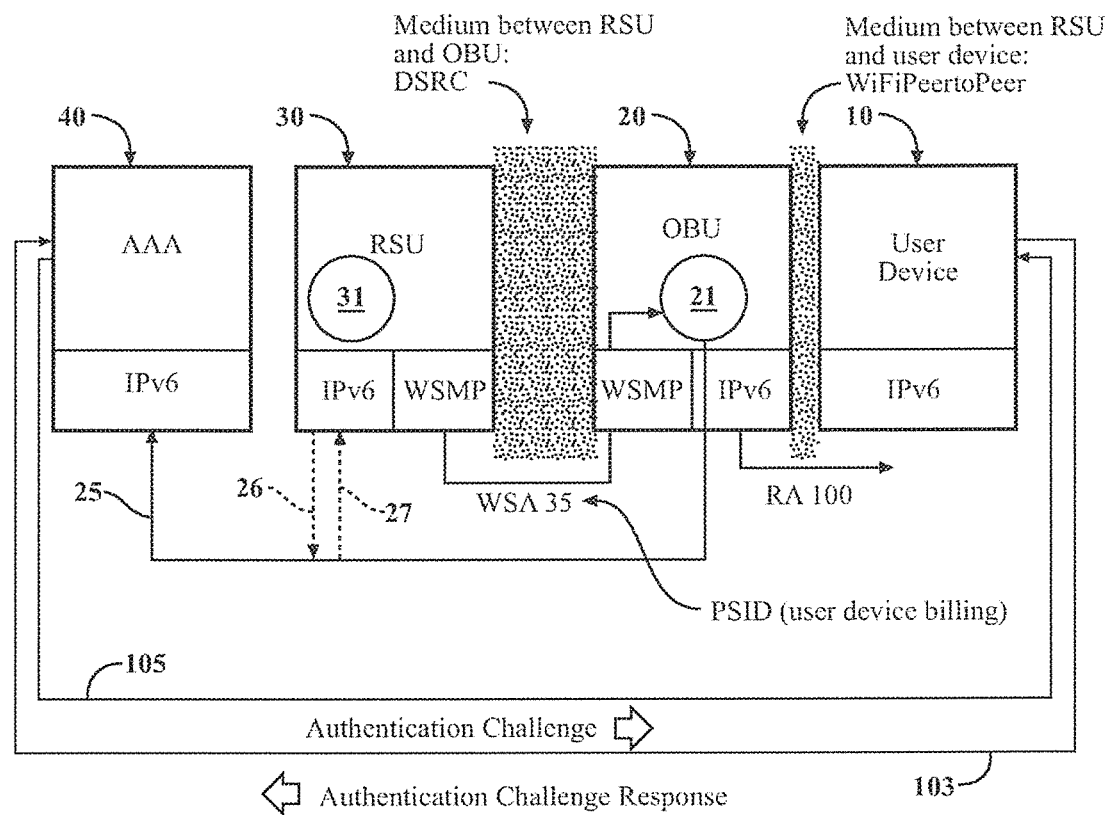
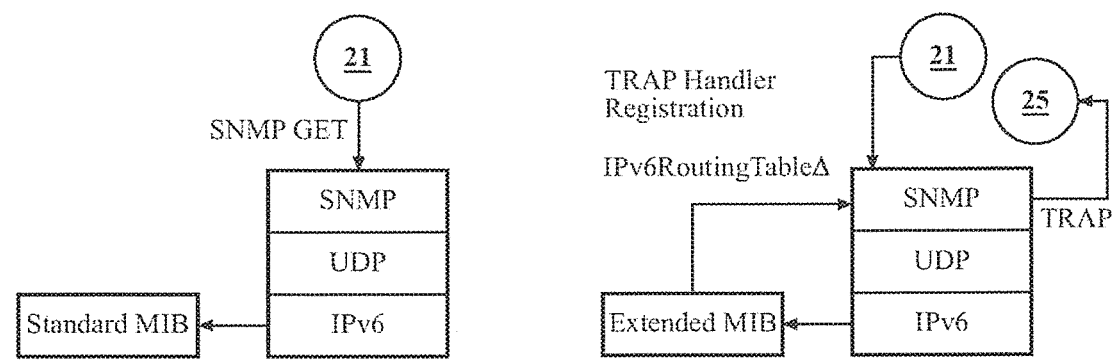
Figure 1b
Figure 1c

SYSTEM FOR AUTHENTICATING AND AUTHORIZING ACCESS TO AND ACCOUNTING FOR WIRELESS ACCESS VEHICULAR ENVIRONMENT CONSUMPTION BY CLIENT DEVICES

CROSS REFERENCE TO RELATED APPLICATIONS

This application is a divisional application of U.S. patent application Ser. No. 17/832,071 filed Jun. 3, 2022, which is a divisional application of U.S. patent application Ser. No. 16/581,016 filed Sep. 24, 2019, which is a continuation application of U.S. patent application Ser. No. 16/253,861 filed Jan. 22, 2019, which is a continuation application of U.S. patent application Ser. No. 15/639,022 filed Jun. 30, 2017, which claims priority to U.S. Provisional Patent Application No. 62/357,504, filed on Jul. 1, 2016, the entire contents of all of which are incorporated herein by reference.

BACKGROUND

In January, 2016, the United States Secretary of Transportation announced that the USDOT was proceeding with the federal motor vehicle safety standard (FMVSS) 150 based on vehicle-to-vehicle (V2V) communications technology called Dedicated Short-Range Communications (DSRC). DSRC operates over a 75 MHz frequency band centered at 5.9 GHz, which had previously been allocated by the FCC to support a broad range of intelligent transportation systems (ITS) applications. During the period 2002-2009, the IEEE developed the 1609 suite of protocol specifications governing the use of the band, which is divided into 7 channels, each with 10 MHz width. Four of the channels support an IPv6 (Internet Protocol Version 6) interface, which means that UDP/IPv6 or TCP/IPv6-based application software can operate over these channels.

The protocol specifications contained in the IEEE 1609 suite, commonly known as Wireless Access Vehicle Environment (WAVE) and incorporated herein by reference, incorporate security provisions to ensure authentication of WAVE-enabled on-board equipment (OBE) attempting to communicate with roadside equipment (RSE). The terminology OBE and RSE is commonly interchanged with OBU (On-board unit) and RSU (roadside unit). OBU typically includes, but is not limited to, a mobile computing device enabled for DSRC communications, meeting the requirements for V2V specified in SAE J2945/1 and SAE J2945/2, or the requirements for V2P, to be specified in future variants of SAE J2945. RSU typically includes, but is not limited to, a stationary or quasi-stationary computing device enabled for DSRC communications, compliant with the IEEE 802.11p specification for the DSRC MAC and PHY layers, the WAVE protocol stack and capable of broadcasting WAVE Service Advertisements (WSAs) on the DSRC Control Channel (CCH). OBU devices without valid security credentials can be effectively denied the WSAs of the RSU, which is typically accomplished by simply discarding transmissions sent by the OBU. WSA are periodic messages defined by the IEEE 1609 protocol suite that identifiers services available on the network.

These aforementioned security provisions present in the IEEE 1609 protocol are aimed at controlling access to services resident in the RSU or accessible to the RSU through dedicated application software in the RSU; i.e. services of which the RSU is "aware" and for which the RSU has the policy responsibility to control access. Examples of such services include, but are not limited to, traveler information, in-vehicle signage, navigation, traffic management, weather information, safety, electronic payment, network services, configuration management, and the like.

In the case of IPv6 communications, the role of the RSU is to route IPv6 datagrams towards their destination address. The WAVE architecture provides for authentication of an OBU based on a digital signature in the headers of WAVE Short Message Protocol (WSMP) messages originating from the OBU. The digital signature is generated by the OBU according to an asymmetrical encryption technique and the message transmitted also includes the certificate containing the public key so that the receiving RSU can decrypt the signature. A DSRC infrastructure authority ("infrastructure authority") may propagate the Certificate Revocation List to the RSUs, which identifies OBU devices for which the security credentials are no longer valid. This can be used by the RSU as a criterion for discarding OBU messages sent using WSMP.

In U.S. patent application Ser. No. 14/151,035, incorporated herein by reference, discloses a system which enables a user-interface device, such as a Smartphone or tablet, to establish connectivity to the Internet by using the mechanism defined in RFC 4861 for Router Discovery. This mechanism allows a user device to attach itself to an OBU using Stateless Address Auto-configuration (SLAAC), for example through a WiFiPeertoPeer (WiFiDirect) interface. The OBU acts as an IPv6 router for the user device to connect with the Internet through any RSU which advertises the availability of one or more WAVE Service Channels for this purpose. The system also provides the foundation of the methods for authentication of the user device.

SUMMARY

In one aspect, a system and method are disclosed which performs Authentication, Authorization and Accounting (AAA) functions necessary to enable an RSU infrastructure operator to quantify wireless bandwidth consumption by in-vehicle devices using the WAVE Service Channels, on a per-device basis.

Another aspect provides a AAA server operated by, or on behalf of a DSRC infrastructure authority, comprising at least one processor running at least one computer program adapted to communicate through the Internet with a plurality of mobile devices and/or an OBU operating a subnet for one or more mobile devices, with a plurality of RSUs, in order to carry out the authentication, authorization, and accounting (AAA), thereby enabling the authority to account for WAVE service channel bandwidth consumption by each of the mobile devices having been duly provisioned by the AAA server.

Another aspect provides a plurality of AAA servers operated by, or on behalf of a DSRC infrastructure authority, each server comprising at least one processor running at least one computer program adapted to communicate through the Internet with a plurality of mobile devices and with a plurality of RSUs in order to carry out the authentication, authorization and accounting, the plurality of AAA servers being arrayed for load balancing of inbound Internet traffic and enabling the authority to account for WAVE service channel bandwidth consumption by each of the mobile devices and/or by an OBU operating a subnet for one or more of the mobile devices, which have been duly provisioned in a single database, access to the database being synchronized among the plurality of AAA servers.

Another aspect provides a RSU configured with an extended IPv6 Management Information Base (MIB) operable to determine packet and byte count statistics for WAVE service channel usage per client device. The client device may be either an OBU, a non-DSRC mobile device that is IPv6-reachable through an OBU, or a DSRC-enabled user device. The IPv6 MIB is also operable to retrieve, for each datagram received from an IPv6 node operating in the route optimization mode of Mobile IPv6, the fixed "home address" of the mobile node carried in the Mobile IPv6 routing header of the datagram. The RSU is operable to accumulate, in Non-Volatile Random Access Memory (NOVRAM), the packet and byte count statistics for WAVE service channel usage per client device and periodically sends the statistics to the AAA server, encapsulated in a UDP/IP message, only refreshing the NOVRAM table when the AAA server has acknowledged reception of the UDP/IP message.

Another aspect provides an OBU, compliant with WAVE and IEEE 802.11p and configurable with dual-radio capability, running at least one application level computer program adapted to request authentication and authorization from the AAA server, for IPv6 connectivity to the Internet, either on behalf of a neighboring non-DSRC mobile device or for itself, and configured with an extended IPv6 MIB operable to retrieve the addresses of neighboring devices when a new entry is inserted in a routing table, using either a synchronous method based on SNMP GET to retrieve the routing table periodically, or an asynchronous method based on SNMP TRAP to report "real-time" changes in the routing table. It is to be appreciated that other methods may be practiced for updating the routing table without deviating from the subject invention.

Another aspect provides a non-DSRC mobile device, operable to request "Internet Subscription" credentials from the AAA server, using a symmetrically encrypted communications channel established with SSL or a similar handshaking protocol for mutual authentication and key exchange, and operable to use the "Internet Subscription" credentials when responding to authentication challenge messages received from the AAA server as defined by one or more exemplary embodiments or aspects herein.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 1 is a system block diagram illustrating an authorization process and an authentication process between a user device and a AAA server according to the subject invention;

FIG. 1b is system block diagram illustrating one method for retrieval of an IP source address from a routing table using Simple Network Management Protocol;

FIG. 1c is system block diagram illustrating another method for retrieval of an IP source address from a routing table using Simple Network Management Protocol;

DETAILED DESCRIPTION

Figure 2:
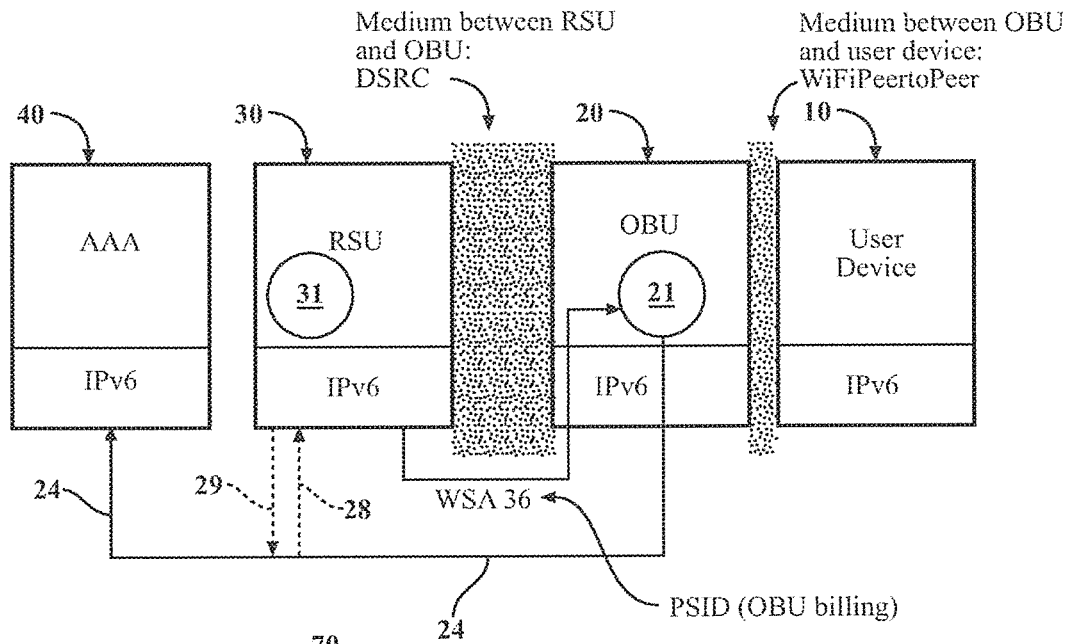
FIG. 2 is a system block diagram illustrating another embodiment of an authorization and authentication process between an On-board Unit and a AAA server.

It is to be understood that the invention is not limited in its application to the details of construction or to the arrangements of the components set forth in the following description of exemplary embodiments, or illustrated in the drawings. The invention is capable of other embodiments and of being practiced and carried out in various ways. Also, it is to be understood that the phraseology and terminology employed herein are for the purpose of the description and should not be regarded as limiting. The use of "including," "comprising," or "having" and variations thereof herein is meant to encompass the items listed thereafter and equivalents thereof as well as additional items. In addition, the terms "connected", "coupled", "de-coupled" and variations thereof are not restricted to physical, mechanical or electrical connections or couplings. Furthermore, and as described in subsequent paragraphs, the specific mechanical and/or other configurations illustrated in the drawings are intended to exemplify embodiments of the invention. However, other alternative configurations are possible which are considered to be within the teachings of the instant disclosure.

In relation to some exemplary embodiments, due to the WAVE security requirements, all nodes (both mobile and stationary) are required to have credentials using the encryption methods specified in IEEE 1609.2. The credentials are issued when the device is provisioned and are used to create digital signatures allowing devices to authenticate themselves, as in the case where mobile devices broadcast a Basic Safety Message (BSM) which carries a digital signature based on the issued credentials. However when a device is provisioned, there is no explicit authorization to use a service channel for general-purpose IPv6 communications. Whether the service channel can be used should depend on whether there is a Provider Service Identification (PSID) for this, duly registered according to the procedure defined in IEEE 1609.12. It is generally assumed that DSRC infrastructure will be deployed and managed using various forms of public-private partnership, all sharing the attributes of an "infrastructure authority", which will address the question of spectrum monetization within the framework of their business models. Provided that an OBU complies with the functional requirements established in the NHTSA safety standard, the decision as to whether the OBU, or a third party user device connected to the OBU, can be granted IPv6 connectivity over the WAVE Service Channels, and whether the bandwidth usage is billed, may become discretionary choices for the infrastructure authority. Therefore, some exemplary embodiments may enable an infrastructure authority to grant or deny IPv6 connectivity to individual devices and to measure the service channel bandwidth consumption associated with each device. This is accomplished by implementation of the subject invention as described herein.

The first step is "Authentication". This is based on a "logon" procedure executed by a client device, which includes user device (e.g. a Smartphone) or alternatively by the OBU acting on behalf of the user device. The distinction between these two scenarios is a function of the business models available from an infrastructure operator and the choice made by an owner of the OBU, which could be an OEM-manufactured device or an aftermarket retrofit. For example, if the owner of the OBU absorbs all of the costs associated with IPv6 bandwidth consumption, regardless of which third party user device is the communications end point, the logon is to emanate from the OBU device. If the costs are attributable to a neighboring third party user device, the accounting for bandwidth is applicable to the user device, which should therefore be the originator of the logon.

The logon is essentially a request for IPv6 connectivity through a neighboring RSU. The user device or the OBU acting on behalf of the user device described above is a requesting device and may be referred to as a "client" or "client device". A logon message is digitally signed using an encryption key obtained from a digital certificate issued by, or on behalf of, the infrastructure operator. The digital certificate is encapsulated in the logon message, enabling the receiver to decrypt the signature and to verify the credentials presented in the certificate. The logon message is encapsulated in a UDP/IP packet addressed to the "Roadway Authorization Server" (RAS), a separate host maintained by the infrastructure operator. As disclosed in application Ser. No. 14/151,035, when a specific RSU is prepared to offer IPv6 connectivity services to passing OBUs, it broadcasts the IP address and application port of the RAS service in a WAVE Service Advertisement (WSA). Since the verification of credentials constitutes the Authentication step and since some exemplary embodiments herein define the complementary functions of authorization and accounting, the RAS in some exemplary embodiments is designated as a AAA server, as will be described in more detail below.

The Authentication step is supported by an external system capable of verifying the credentials identified in the logon message. Such a system has been defined as part of the Federal Motor Vehicle Safety Standard (FMVSS) 150, called the Security Credentials and Management System (SCMS). SCMS is based on a Public Key Infrastructure (PKI) architecture, wherein asymmetrical encryption keys are generated by a "root" certificate authority and encapsulated in digital certificates which constitute the credentials of the client device. The technical architecture of SCMS has evolved from a cooperative effort by the USDOT and the automotive industry, as represented by the Collision Avoidance Metrics Partnership (CAMP). A detailed description of SCMS can be found at http://federalregister.gov/a/2014-24482, which is incorporated herein by reference. The primary purpose of SCMS is to ensure that devices participating in the vehicle-to-vehicle (V2V) communications defined by the FMVSS 150 are duly certified and that their operation does not compromise consumer privacy. Through a secure link between the AAA server and the SCMS, the AAA server is enabled to request assistance from SCMS components in validating the security credentials of a specific device. The validation process is based on the digital signature, the certificate information and an encrypted unique identifier for the device, all of which is encapsulated in the logon received from that device. It is to be appreciated that the digital signature, the certificate information and the encrypted unique identifier could be transmitted separately in a secure manner.

The next step is "Authorization", to which there are two aspects. The first is the verification that the credentials of the client device have not been revoked by the credentialing authority. This is done using the Certificate Revocation List, which is maintained by the SCMS. The current specification for SCMS calls for distribution of the Certificate Revocation List only to OBUs and RSUs. However, the Certificate Revocation List is also to be distributed to the AAA server, in order to enable the latter for the aforementioned verification. The second aspect is that the account associated with the client is in good standing, which is determined according to the policy of the infrastructure operator.

The Authorization step may only be required when the Authentication step passes. A Boolean result of "fail" for the first step, or the logical conjunction of both steps, becomes an input to a mechanism which enables the AAA server to manage an IPv6 routing table of the RSU currently providing the connectivity to the client. Implementation of this capability is based on harnessing existing methods specified in IETF RFCs. Specifically, by adding the functionality of Border Gateway Protocol (BGP) to both the AAA server and the RSU, the AAA server is enabled for Remotely Triggered Black Hole (RTBH) filtering within the RSU, whereby IPv6 traffic from the client can be either blocked or unblocked based on whether the client passed the Authentication and Authorization steps. This methodology provides an efficient, standards-based means of controlling access to the mobile Internet services which infrastructure operators may want to offer, and links the duly authorized credentials of the client device requesting the service to the IPv6 routing table of the RSU, without the need to alter the WAVE suite of specifications.

The final step is Accounting. The RSU is configured to keep track of the service channel bandwidth consumption by each device, when using the IPv6 interface, and periodically send reports to the AAA server. To accomplish this, the Management Information Base (MIB) of the IPv6 layer may be extended to acquire packet and byte count statistics per client. The consumption data is retrieved using a standard SNMP interface and periodically transmitted to the AAA server, for example through a TCP connection.

In relation to some exemplary embodiments, a DSRC RSU routes IPv6 datagrams received from, or transmitted to, an OBU via a WAVE Service Channel. If the owner of the RSU, which may be the "infrastructure authority", adopts a policy to control and manage service channel bandwidth usage by individual OBUs, and devices connected to OBUs, then mechanisms are required to authenticate these devices, authorize their use of service channel and account for the amount of bandwidth consumed by each device. The subject invention provides a server which supports these mechanisms, which is typically called AAA (authentication, authorization and accounting).

A single-radio OBU device which adheres to the required duty cycle for monitoring both the safety or "V2V" channel, (which is now specified at CH 172 at the "bottom" of the DSRC band) and the Control Channel (CCH or CH 178), may not be suitable for providing IPv6 connectivity services, since, at a minimum, its receiver would have to divide its time even further between the safety channel, CCH and the designated service channel. The incremental cost of dual-radio devices is sufficiently low to warrant vendors configuring an OBU product, either an Aftermarket Safety Device (ASD) or Retrofit Safety Device (RSD), as defined in the "V2V Readiness Report", incorporated herein by reference, as a dual-radio device. It is therefore assumed throughout this disclosure that an OBU providing access to service channel bandwidth is configured as a dual-radio device. However, it is to be appreciated that the subject invention could also be implement with the single radio device.

Since the WAVE standard allows IPv6 datagrams to be transmitted on the service channel without any restriction, the RSU which receives the datagram will automatically route it towards its destination. However, if the administrative policy for the RSU calls for IPv6 traffic to be subject to AAA, then authorization for over-the-air IPv6 communications is to be requested on behalf of either the OBU or one or more devices connected to it.

FIG. 1 illustrates the authorization process and an authentication process between the user device and the AAA server according to the subject invention. The notification from the RSU indicating the requirement for authorization is embodied in the WAVE Service Advertisement (WSA) 35. WSAs, which are broadcast on the WAVE CCH by RSUs, constitute the method, required by the WAVE standard, with which the RSU informs the OBUs what services are accessible through the RSU broadcasting the WSA.

RSU 30 is configured by the infrastructure operator to issue a WSA which includes the IP address and port of the AAA service to which the OBU can send an authorization request. As disclosed in U.S. patent application Ser. No. 14/151,035, the WSA has previously been used to identify only the address where the OBU should send an authorization request. The subject invention utilizes the WSA to also include channel availability information which the OBU should use for channel configuration, as described further below. WSA 35 encapsulates both the IP address and port for the AAA server. WSA 35 also encapsulates a Provider Service Identification (PSID) signifying that this RSU supports the availability of general-purpose IPv6 connectivity subject to AAA management, as well as the identifiers of the available service channels. Different PSIDs are established in order to allow the OBU to differentiate between a service which applies billing charges to the OBU for any neighboring user devices and one for which each user device is associated with its own billing account. The utility of this differentiation is explained further below. Otherwise, as previously indicated, if there is no requirement for AAA, WSA 35 is not required because access to the service channel may be automatic or not restricted. As used herein, automatic means real-time or near real-time automated processing by one or more processors, non-manually and without human intervention. However, it is to be appreciated that manual involvement may be required without deviating from the subject invention.

The content of WSA 35 is reported to Process 21, which is generally a user application running in OBU 20, through the WSMP interface. Process 21 is implemented by and executed by a processor resident in the OBU 20. It is to be appreciated that the processor may be any readily available device capable of preforming the processes as described herein. The process steps or instructions, which execute via the processor of OBU 20 or user device 10, implement the functions/acts specified in the flowchart and/or diagram shown throughout the Figures and discussed herein. Process 21 then registers a "transmitter profile" with the MAC Layer Management Entity (MLME) which specifies the service channel number specified in the WSA. This registration of the transmitter profile ensures that the MLME is always updated whenever a policy change results in a change to the services advertised in a WSA. If IPv6 connectivity services are deactivated at a specific time or location (i.e. specific RSU or cluster of RSUs), the PSIDs corresponding to these services are not present in the WSA and process 21 registers a new transmitter profile which does not include the corresponding service channel number. As explained in IEEE 1609.4, when the Channel Router function of the IEEE 802.11p MAC layer (not shown in FIG. 1) cannot find this service channel number, packets intended for transmission using this channel are discarded.

The authorization function involves a request sent by OBU 20 to the AAA server 40, illustrated in FIG. 1 by authorization request, or message, 25. An example of such messages 25 are disclosed in U.S. patent application Ser. No. 14/151,035, wherein it takes the form of a UDP/IPv6 message. This message 25 is initiated by process 21, and process 21 listens for WSA 35. If the request has not already been granted by the AAA server 40, process 21 queues the message 25 for transmission through the IPv6 interface. WSA 35 indicates that the service advertised is billed to an individual account for a third party user device and therefore the authorization request is from the OBU "on behalf of" the third party device, for example a neighboring Smartphone or tablet, the interface between the OBU and the third party device being, in some exemplary embodiments, a wireless link such as WiFi Direct (also called WiFi Peer to Peer). In this instance the UDP payload of message 25 contains the IP source address of the user device.

The mechanism whereby user device 10 attaches itself to OBU 20 requires that the latter is configured to support the IPv6 "neighbor discovery" specification in RFC 4861, incorporated herein by reference. In this specification, a network node notifies its neighbors of its routing capabilities through periodic broadcasts of a "router advertisement" (RA) over the interface through which the neighbors may wish to join the network. The router advertisement is shown in FIG. 1 as RA 100. U.S. patent application Ser. No. 14/151,035 discloses the process of attachment in terms of the mechanism of Stateless Address Auto-Configuration (SLAAC) specified in RFC 4862 which is also incorporated herein by reference.

Prior systems, such as that disclosed in U.S. patent application Ser. No. 14/151,035, did not disclose the method by which the IP source addresses contained in the authorization requests exemplified by message 25 is obtained. When the user device attaches itself to the OBU, the latter may discover the IP source address, in some exemplary embodiments, due to a reception of a Router Solicitation message from the user device, which, as defined in RFC 4861, results in the address of the user device being added to the OBUs routing table. Acquisition of this information requires implementation of SNMP in the OBU. There are two alternative methods that would then be possible, illustrated in FIGS. 1b and 1c, respectively, which illustrate well-known protocol layers. The simplest method (FIG. 1b) is to configure process 21 to periodically issue an SNMP GET to the localhost to retrieve the ipv6RouteTable object in the IPv6 MIB. The second method (FIG. 1c) is computationally more efficient but requires an extension to the standard IPv6 MIB which defines a new object corresponding to a change in the routing table. When this is detected, a TRAP message is generated which can be received by a handler function 25, registered with the SNMP layer by process 21.

Using WAVE as a platform for mobile Internet services which rely on TCP at the transport layer is frequently discouraged because the OBU address changes as the device moves from one RSU to another. As a result, the user device attaching itself to the OBU will always discover a change in its own IPv6 address with each transition between RSUs, which will disrupt TCP sessions and in turn degrade the quality of any connection-oriented streaming services above the transport layer. The subject invention overcomes these problems by enabling the user device for Mobile IPv6, which is specified in RFC 6275 and incorporated herein by reference, and configured for the "route optimization" (section 11.3.1) mode. According to one aspect of the subject invention, the OBU 20 becomes the primary "care-of address" for the neighboring user device. In the "route optimization" mode, the "home address" is carried in the IPv6 Destination Option header. This address is fixed and used as a substitute for the IP source address and destination addresses, since the latter, in the route optimization mode of Mobile IPv6, are the mobile node's "care-of address" address, which is the OBU itself, or, in the case of a DSRC-enabled user device, such as a Smartphone incorporating a DSRC interface, is the RSU. The substitution is therefore required to ensure the granular accumulation of traffic statistics per individual user device, implemented by the Accounting function described below, rather than an aggregate for the OBU to which they are attached. Similarly to the mechanisms explained above in connection with the OBU obtaining the IP source address shown in FIGS. 1b and 1c, the "home address" information required can be acquired by process 31 running in the RSU 30 using an SNMP GET call to retrieve it from the Mobile IPv6 MIB or by processing a TRAP generated for each datagram routed by the RSU.

In some exemplary embodiments, the OBU includes authentication information in the request message 25, which enables both authorization and authentication to be combined in a single step. This procedure is used in the case where the accounting of service channel bandwidth consumption is aggregated for all devices neighboring the OBU 20 and billed to a single account associated with the OBU 20. As shown in FIG. 2, the WSA 36 uses a distinct PSID reflecting the nature of the service. In this instance, AAA server 40 receives message 24 containing information required to authenticate the client, and therefore does not need to respond with an authentication challenge. The information required for authentication is well known, and may include, but is not limited to, International Mobile Equipment Identity for Smartphones or vehicle identification number, or other such Personal Identifying Information. The method of authentication is described below. The path segments 28 and 29 in FIG. 2 are functionally equivalent to the path segments 27 and 26 in FIG. 1. Also in, in some exemplary embodiments, in order to facilitate the Accounting process, the payload in message 24 should contain the OBU's IP address in lieu of the actual source IP address. Subsequent IPv6 datagrams originating from the user device will contain this address in the routing header. This enables the RSU to accumulate the datagram byte count for active OBUs as explained in more detail below.

Referring back to FIG. 1, RSU 30 is the first IPv6 hop for the authorization request 25, which is transmitted over a service channel. RSU 30 then routes the datagram towards its destination. The routing is illustrated by the path segments 26 and 27 in FIG. 1, which are respectively, the inbound IEEE 802.11p MAC frame received from the service channel and the outbound frame on whatever medium is deployed for backhaul to the Internet. In order to account for service channel bandwidth consumption by individual user devices, RSU 30 caches the source IP address of the datagram in a non-volatile random-access memory (NOVRAM) table of such addresses. In the accounting process of the subject invention, the source IP of inbound datagrams, and the destination IP address of outbound datagrams, are matched against the entries in this table and the datagram byte counts are accumulated in the NOVRAM table for the entry corresponding to the correct match. If the RSU is configured for accounting of aggregated service channel bandwidth consumption for all devices neighboring the OBU, then the entry in the NOVRAM table must be the address of the OBU, which can be parsed from the IPv6 header.

Upon receipt of the authorization request 25, AAA server 40 is configured to authenticate the client. FIG. 1 depicts the AAA server 40 sending an UDP/IP authentication challenge message 105 (or Authentication Challenge) to the IP source address associated with the request, which is the user device 10. The response mechanism is shown in FIG. 1 as Authentication Challenge Response 103. The challenge response 103 serves to verify the credentials of the sender, so it requires a secure encryption methodology allowing the sender to prove its authenticity to the infrastructure authority. Since the DSRC cyber-security provisions are specified in IEEE 1609.2, and since the encryption keying material is contained in digital certificates produced and distributed by certificate authorities operated by, or in collaboration with, the infrastructure authority, it follows that these certificate authorities can also provide the same kind of certificates (i.e. compliant with IEEE 1609.2 specifications) to user devices as will be provided to OBUs and RSUs.

User device 10 assembles the Authentication Challenge Response 103, involving the encryption keying material (basically the public key of the certificate issued to the user device) and an encrypted payload including some unique identifying information, such as its International Mobile Equipment Identifier (IMEI). Successful decryption enables the receiver to authenticate the user device according to the asymmetrical encryption technology specified in the IEEE 1609.2. Upon receipt of Authentication Challenge Response 103, AAA Server 40 performs a search through a database for the IP source address. This database includes a table, of which the row entries may contain, at a minimum, a unique device identifier, an IPv6 address, security credentials issued to the device by a duly authorized certificate authority and the accumulated WAVE service channel bandwidth consumption within the current reporting period. If a match is found for the IP source address, this means that this address has been previously encountered and will have already been authenticated. However, in the event that this address is a duplicate of another IPv6 address, formulated according to SLAAC, at a previous time with an entirely different OBU, then the least amount of time it would take for an OBU to leave and then return to the coverage area of an RSU may define the point at which the source IPv6 may be a possible duplicate address, therefore requiring that AAA server 40 authenticate the client.

Figure 3:
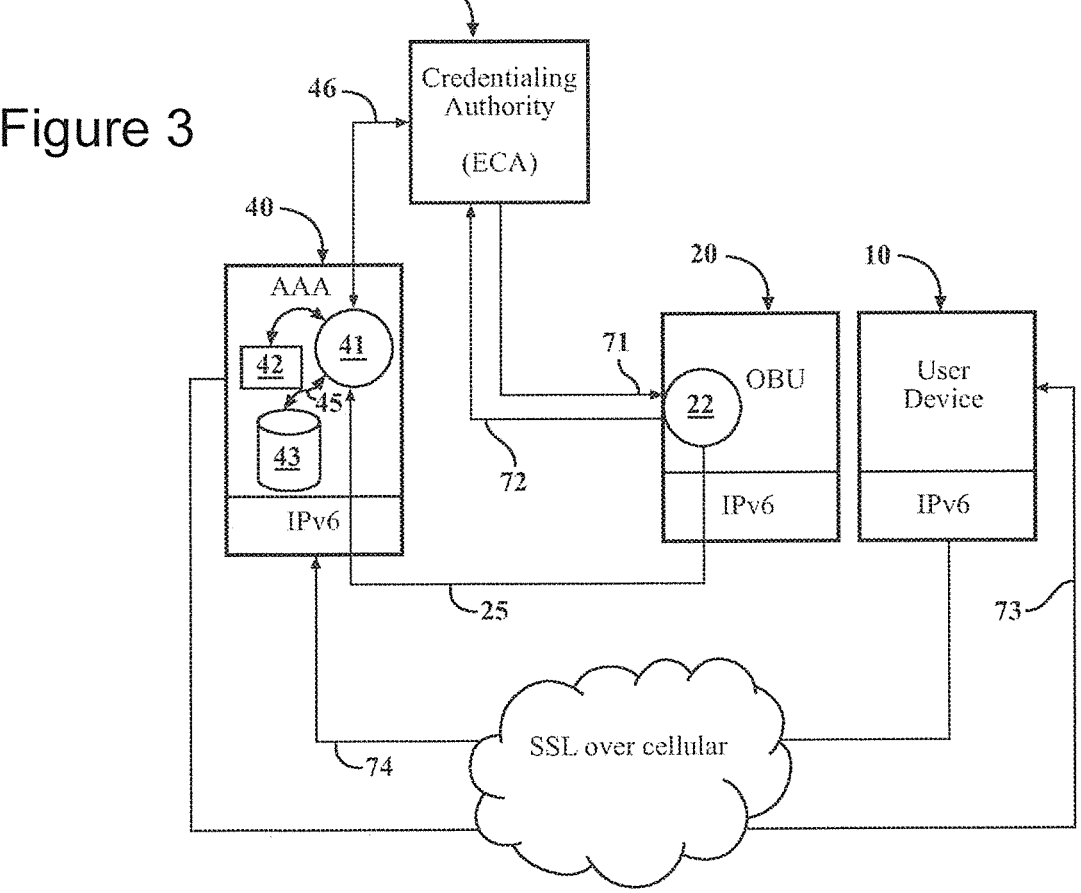
FIG. 3 is a system block diagram illustrating an embodiment of an authentication process according to the subject invention.

The ability of the AAA server 40 to authenticate a client and to authorize its use of an service channel is dependent on whether it implements the encryption/decryption process specified in the request. The preferred mechanism for authentication is illustrated in FIG. 3, which depicts the process of issuing, to the client device 10, the security credentials which it employs when it needs to be authenticated by the receivers of its messages. The security credentials are issued by an entity called the Enrollment Certificate Authority (ECA) which is one of the Certificate Management Entities (CMEs) defined within the SCMS.

The issuance of security credentials by the ECA 70 to the OBU 20 is shown in FIG. 3 by the operation 71. However, the functional specifications for the issuance of security certificates are part of the bootstrapping process defined by the SCMS whereby the ECA assigns a long-term enrollment certificate or similar to each OBU, which is well-known and beyond the scope of the present disclosure. The enrollment certificate provides, in one possible form, the credentials needed by the OBU for authentication during subsequent procedures defined within the scope of the SCMS. These procedures have been designed so that the digital signatures accompanying the basic safety messages serve the dual purpose of preserving the anonymity of individual vehicles while ensuring that the signatures are authentic, in the sense that the encryption keying material used to create them was duly issued by an authorized certificate management entity.

The design criteria for the SCMS architecture have, as a primary objective, the protection of consumer anonymity, and does not include requirements for "monetizing" WAVE service channels based on bandwidth consumption per device. As the subject invention provides for accounting procedures, the ability to associate bandwidth consumption with a specific device requires that the security credentials, i.e. the certificates issued by the CMEs, include unique Personal Identifying Information (PII). Generally, the SCMS design ensures that no PII will be available in any certificates used by OBUs to digitally sign messages, such as basic safety messages. This ensures that while the security credentials of a transmitting device can be validated, its anonymity is protected because it is not possible to identify a device. Therefore, an infrastructure authority requiring AAA functionality cannot rely on enrollment certificates alone to associate bandwidth consumption with any specific OBU or third-party device.

However, the use of WAVE bandwidth to provide mobile Internet services is based on a consumer discretionary choice. Hence, when the infrastructure authority requests some form of PII in order to register for the service, there is no violation of privacy. One example of PII that can be automatically acquired and delivered to the AAA server is the Vehicle Identification Number (VIN), which can be acquired by an OBU with a CAN-bus connection to the Engine Control Module (ECM) using protocols defined in the SAE standard J-1979 or similar protocols. This is the preferred PII in the case of a billing applied to the aggregate traffic through the OBU, since aftermarket OBU devices can be moved from one vehicle to another.

The preferred mechanism for establishing the association between the SCMS issued credentials encapsulated in the enrollment certificate and the PII which can be linked directly to a billing account, is shown in FIG. 3. Process 22 is an application-level software module running in the OBU 20 with two principal functional responsibilities. Process 22 is implemented by and executed by a processor resident in the OBU 20. It is to be appreciated that the processor may be any readily available device capable of preforming the processes and/or instruction as described herein. The process steps or instructions, which execute via the processor of OBU 20 or user device 10 implement the functions/acts specified in the flowchart and/or diagram shown throughout the Figures and discussed herein. First, process 22 maintains a listener to receive the credential certificate, as shown by the operation 71, which delivers the certificate from the ECA, and an acknowledgement 72, which confirms (or rejects) reception of the certificate. It is to be appreciated that the certificate that is received in operation 71 may be, separately or together, an enrollment certificate, an identification certificate, or other certifying credential used for the authentication function. For simplicity, the following discussion will describe the authentication with the enrollment certificate, without limiting the subject invention thereto. Utilizing the other credential certificates in the same manner is envisioned within this disclosure. To this extent, process 22 is a required component of OBU application software. Second, when operating within range of an RSU that advertises billable 1Pv6 connectivity services, process 22 has the responsibility of triggering a request 25 from OBU 20 to the AAA server 40, which combines both the authorization and authentication functions in one step. Using the private key of the asymmetrical encryption methodology specified in the enrollment certificate, process 22 encrypts the VIN (acquired by interrogating the ECM using standard protocols defined in SAE J-1979). The encrypted VIN is appended to the enrollment certificate information, which includes the public key, and sends the authorization request 25 to the receiver of the AAA server 40 that can use the public key to decrypt the VIN. For simplicity of presentation, the two software functions described above are implemented within the single process 22. In another embodiment, these two functions could be decoupled so as to yield two separate processes.

The SCMS specifications define the ECA as responsible for enrollment of DSRC devices which, by definition, comply with all the standards (IEEE 1609.x, IEEE 802.11p, SAE J-2735 and SAE J-2945) required for these devices to be certified. However, when IPv6 traffic using the WAVE service channel originates from non-DSRC mobile devices, and it is the policy of the infrastructure authority to create billing accounts for individual non-DSRC mobile devices, these devices require the same kind of credentials if their traffic is to be authorized by the AAA system. To issue such credentials, the AAA server is enabled as a certificate management entity only for non-DSRC mobile devices neighboring OBUs and whose IP traffic can be offloaded onto the WAVE service channel. The certificates produced are "Internet Subscription Certificates" in order to distinguish them from OBU enrollment certificates or the like. Operations 73 and 74 in FIG. 3 illustrate the issuance of such credentials. In some exemplary embodiments, the communications path for the distribution of these credentials is based on an SSL session between the non-DSRC mobile device and the AAA server.

In some exemplary embodiments, there are three conditions to be satisfied in order for the AAA server 40 to authorize OBU 20 for access to the IPv6 connectivity service of RSU 30. First, the security credentials of OBU 20 are validated. This is accomplished by successful decryption of the PII encapsulated in the request 25 and received by process 41, using the public key of the enrollment certificate sent in the request. The decryption algorithm is implemented as software module 42 running in AAA server 40, and invoked through a synchronous call from process 41, as shown in FIG. 3. Process 41 is implemented by and executed by a processor resident in the AAA server 40. It is to be appreciated that the processor may be any readily available device capable of preforming the processes and/or instruction as described herein. The process steps or instructions, which execute via the processor of the AAA server 40, implement the functions/acts specified in the flowchart and/or diagram shown throughout the Figures and discussed herein. Second, a database 43 of subscribers registered in the AAA server 40 is queried by the search 45 to determine if the PII is found. This constitutes authentication of OBU 20.

Figure 9:
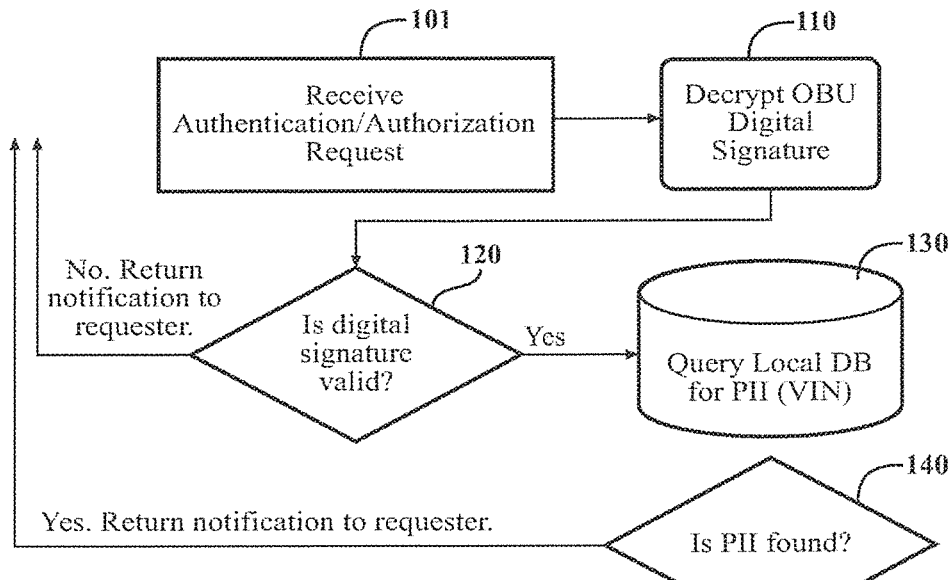
FIG. 9 is a flowchart illustrating the authorization process according to the subject invention.

In addition, the flow chart in FIG. 9 summarizes these steps. The AAA server 40 receives the authentication and/or authorization request in step 101. Next, the OBU 20 digital signature is decrypted in step 110. The digital signature is then validated in step 120 and if the signature is not validated, notification is returned to the OBU 20. If the signature if validated, in step 130, the database 43 is queried for the PII. If the PII is found in step 140, notification is returned to the OBU 20. Otherwise, the request is forwarded to the ECA in step 150.

Typically, user registration is carried out through a Web User or Web Services interface offered by the DSRC infrastructure operator. The actual registration method(s) is (are) outside the scope of this disclosure. Whatever method is used, it is to enable the infrastructure operator to create an account associated with unique identifying information (PII), for example the VIN of the vehicle.

It is a fundamental tenet of USDOT policy that operation of DSRC infrastructure will be decentralized across the United States. It is envisioned that local jurisdictions, whether they are cities, counties, regional municipal authorities or state DOTs, will establish, or oversee the establishment of, independent DSRC infrastructure operators. Whereas it is expected that in many or perhaps all cases, these operating entities will take the form of public-private partnerships, the corporate structure, the roles and responsibilities of the partners and the procedures for establishing policies which are implemented using the DSRC technology itself, may vary. With particular reference to the present disclosure, there is no technical reason why the policy with respect to mobile Internet service has to be standardized across all jurisdictions. Each jurisdiction has the option of enabling a mobile Internet service through whichever RSUs are deployed within its territory and subject to its management, and to apply whatever schedule of charges for bandwidth consumption of the WAVE service channels that it deems appropriate.

The last of the three steps for authentication arises when there is no local database match for the PII, which requires additional procedures set forth below. To ensure interoperability across regions for mobile Internet services, each infrastructure authority is to maintain a AAA server in which vehicles associated with that territory can be registered. An example of the need for this arises in the following scenario. A vehicle is registered (with the DMV) as having an address within a region where the policy of the infrastructure authority is for free mobile Internet service. The vehicle is currently travelling in another region which applies charges for bandwidth consumption and operates the administrative tools (AAA server) for this purpose. Each RSU in this region will advertise the IP address and UDP port number only of the AAA server which is owned and operated by the local authority. The OBU in the vehicle requests authorization to access the service. If the request comes from a non-DSRC mobile device, the AAA server attempts to validate the credentials. Otherwise it requests validation from the ECA for the enrollment certificate used by the OBU. But since the decrypted PII (e.g. the VIN) will not appear in the AAA database, the infrastructure authority could assert its right to deny the vehicle access to the mobile Internet services. The mechanisms for enabling or prohibiting access to the mobile Internet services are described below. However, if a "foreign" vehicle is not registered in its AAA server, an infrastructure authority is operable to interrogate the entire population of AAA servers wherever they have been deployed throughout the jurisdiction governed by the SCMS. If the infrastructure authority prohibits access to a "foreign" vehicle (i.e. one that is not registered in its AAA server) it is operable to forego the revenue that could otherwise be generated from an account associated with the PII registered in a "remote" AAA server.

In short, if mobile Internet services are to be accessible wherever a vehicle operates, a mechanism is necessary to enable the operator providing the service to authenticate a "foreign" vehicle operating in its territory and to reconcile the charges for bandwidth consumption with the AAA server in the home territory.

Figure 4:
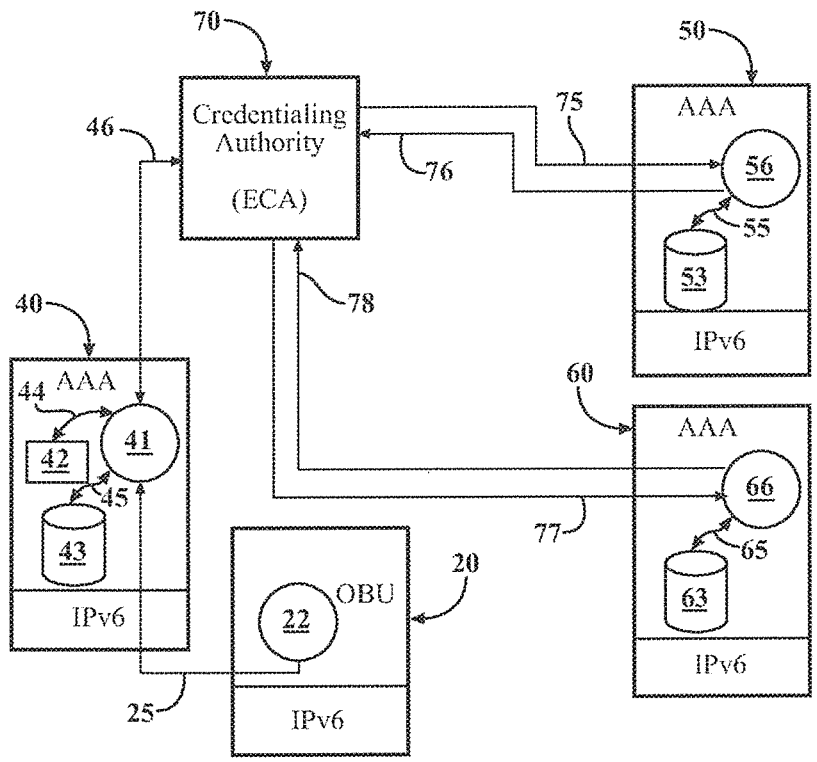
FIG. 4 is a system block diagram illustrating an authentication process for foreign devices according to the subject invention.

FIG. 4 illustrates the sequence of steps needed to find a "foreign" vehicle. As discussed above, the role of the ECA with respect to issuance of credentials to mobile devices is defined within the scope of the SCMS specifications. However, the ECA encompasses an additional role for authentication of devices which request mobile Internet services but cannot be found in local AAA server databases. This new role requires that the AAA server be integrated into the Public Key Infrastructure (PKI) architecture of the SCMS.

PKI systems are commonly used in Internet transactions for computing devices to present security credentials to any other device that needs proof of authenticity. Security credentials can be derived from a trust "chain" or "hierarchy", whereby a digital certificate containing the credential(s), itself, is to be authenticated according to the digital signature of the issuer of the certificate. Authentication of a device based on the certificate it presents may require several iterations before reaching a "root" certificate authority which does not derive its trustworthiness from another entity above it in the "trust hierarchy".

The role for the ECA is to incorporate the requisite functionality to support the various procedures or functions of exemplary embodiments herein. In particular, it is configured to issue a certificate to any AAA server that an infrastructure authority wishes to deploy. By doing so, it extends the trust hierarchy of the SCMS into the AAA servers that infrastructure authorities need to manage the monetization of the WAVE service channel spectrum. Furthermore, it is to maintain a NOVRAM table of the IP addresses of each AAA server to which it has issued certificates. This ensures that when the PII for the client cannot be found in the database of the local AAA server, the ECA can interrogate all of the duly certified AAA servers operating under the jurisdiction of the SCMS, in order to determine whether the vehicle in question is registered somewhere, as illustrated in step 150 of the flow chart in FIG. 9.

The interrogation of "remote" AAA servers by the ECA is exemplified in FIG. 4 by the interaction between the ECA 70 and the AAA servers 50 and 60. This representation is intended solely for the purpose of simplifying the diagram and is not intended to imply that the interrogation process is restricted to only two AAA servers. In the first case, ECA 70 sends a request 75 to a specified listener 56 running in AAA server 50, which in turn issues the query 55 to the database 53 for the VIN. A binary result (found/not found) is returned to the ECA with the response 76. Similarly, request 77 to listener 66 in AAA server 60, encompassing listener 66 and database 63 which are functionally equivalent to listener 40 and database 43, will trigger query 65 and the same type of binary result in response 78. Since the AAA servers are integrated in the PKI architecture of the SCMS system, the security provisions exists to ensure the confidentiality of the VIN information transmitted by the ECA.

Figure 6:
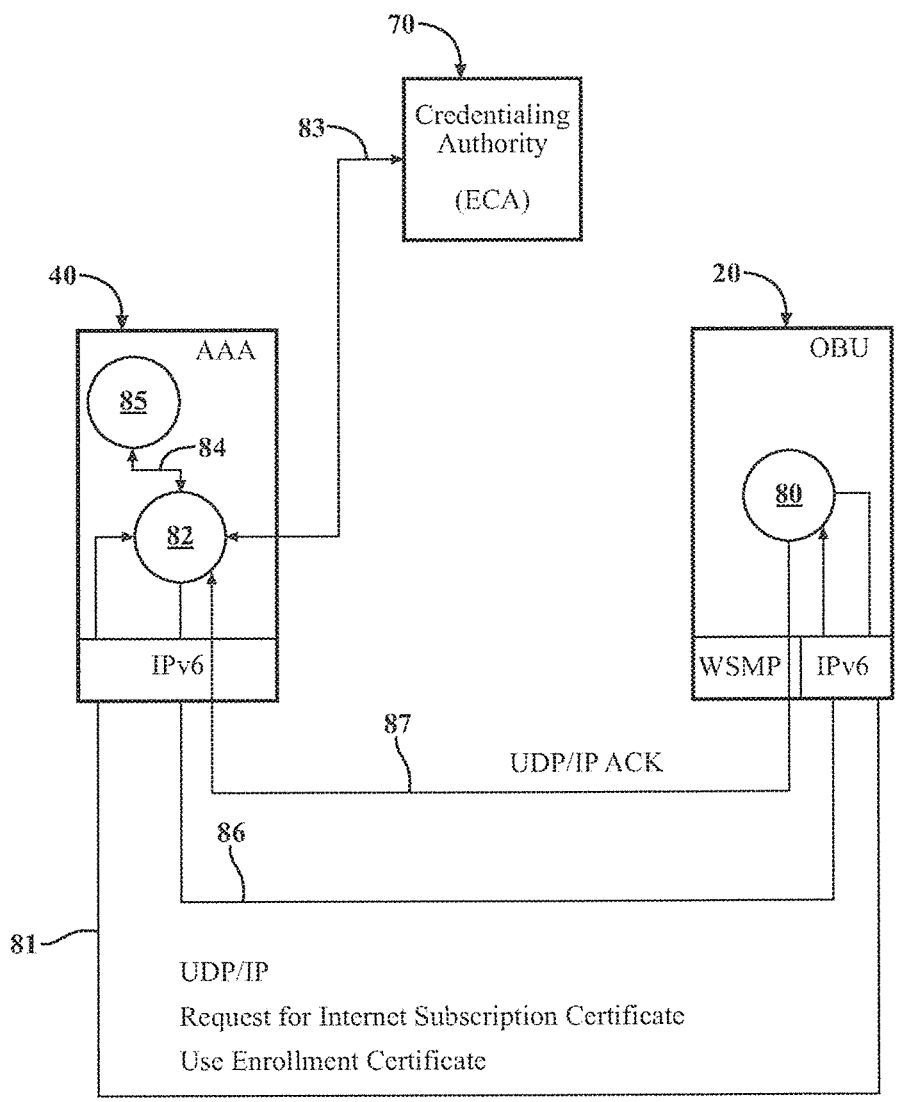
FIG. 6 is a system block diagram illustrating a process for distribution of security credentials according to another embodiment of the subject invention.

Alternatively, and in order to decouple the credentialing responsibilities of the ECA as currently specified in the SCMS, from the credentialing requirements for any device associated with a mobile IP billing account, the AAA server is configured to issue "Internet Subscription" certificates to DSRC OBUs, as well as to non-DSRC mobile devices, as previously described. In this case, the communications path for distribution of "Internet Subscription" certificates to OBUs is over DSRC, instead of cellular, and the certificate information is, in some exemplary embodiments, secured by asymmetrical encryption using the enrollment certificate. The authorization request 25 from an OBU 20 uses its Internet Subscription certificate (in lieu of the enrollment certificate) to request authentication from the AAA server 40. This is illustrated in FIG. 6. The sequence of steps required to obtain an Internet Subscription certificate is as follows:

- process 80 is spawned by process 21 (FIG. 1), running in OBU 20, the first time the WSA 35 (or 36) is received.
- OBU 20 sends UPD/IP message 81 to the process 82, running in the AAA server 40, to request an Internet Subscription certificate. This request includes the OBU's enrollment certificate information.
- process 82 sends a request/response exchange 83 to the ECA 70 to validate that the enrollment certificate has not been revoked.
- process 82 sends request/response exchange 84 to module 85 to generate an asymmetrical encryption key pair for OBU 20 and an Internet Subscription certificate containing this information.
- Process 82 encrypts the information generated by module 85, using the public key of the enrollment certificate received in message 81, and returns this, as the payload of message 86, to process 80 of the OBU 20.
- OBU 20 acknowledges receipt with message 87.

The additional advantage of "Internet Subscription" certificates for OBUs is that it eliminates the need for interrogation, by the ECA, of multiple AAA servers in order to search for a "foreign" vehicle. Internet Subscription certificates include the domain name of the AAA server that issues them, which are included in the authorization request from OBUs (or in the authorization challenge response from non-DSRC mobile devices). The AAA server receiving the request can therefore resolve the domain name to an IP address. In turn, rather than scanning all remote servers until a match is found (requests 75, 77 and responses 76, 78 in FIG. 4), only a single UDP/IP request/response is required.

Figure 7:
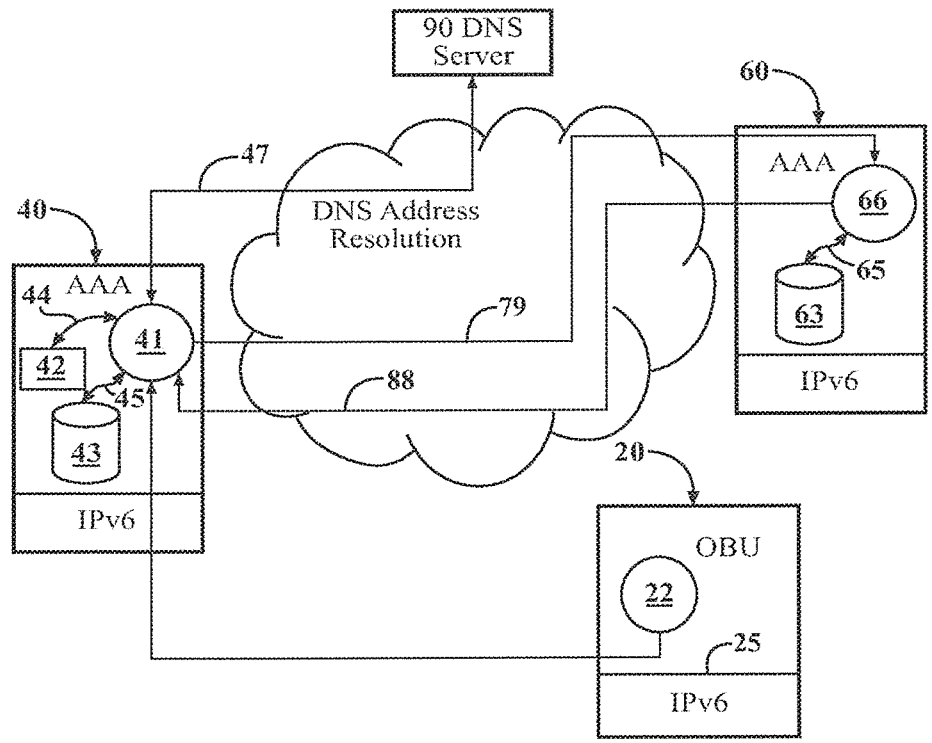
FIG. 7 is a system block diagram illustrating yet another authentication and authorization process for foreign devices according to the subject invention.

This alternative path of authorization/authentication of a "foreign" device is shown in FIG. 7. Process 41 running in AAA server 40 uses a DNS address resolution request 47 to a DNS server 90 to acquire the IP address of a remote AAA server 60, and then forwards the request 79 to AAA server 60. To ensure confidentiality of the PII information in the payload of request 79, AAA server 40 uses its own credentials obtained from the ECA, encrypting request 79 with its private key and sending its certificate information in request 79 so that remote AAA server 60 has the public key to decrypt the message. Since the credentials of AAA server 40 are obtained from the ECA, this both protects the private information included in request 79, and enables the remote AAA server 60 to authenticate the sender as being linked to the SCMS chain of trust and provide a response 88.

The third condition for authorization is to ensure that the enrollment certificate itself is confirmed as not having expired or been revoked for some reason. Some exemplary embodiments of a mechanism for accomplishing the authorization may involve constructing the request 46 such that its primary objective is verification that the enrollment certificate does not appear is the latest Certificate Revocation List maintained and disseminated by the SCMS. However, if the Certificate Revocation List is propagated by the SCMS to the AAA Server, there is no longer a requirement for request 46 to ask the ECA to verify the received certificate against the Certificate Revocation List. Secondarily, and only if the enrollment certificate is valid and the method described above, of directly interrogating the AAA server identified in the "Internet Subscription" certificate, is not used, request 46 can specify whether the PII in the request (i.e. the VIN) was not found in the local database and needs to be searched in the remote AAA servers.

AAA server 40 may respond to the sender of the request for authorization. If the security credentials are invalid or have been revoked, the billing account is delinquent or simply non-existent; the governing policy may call for the request to be denied. However, in order to ensure that IPv6 traffic is blocked, it is not sufficient for the AAA server 40 to send the client a notification of denial. Since the process of granting authorization for IPv6 connectivity falls outside the scope of the IEEE 1609 specifications, it follows that any device requesting such authorization is doing so "voluntarily" and that, if it is denied the authorization, it is not "obligated" to abide by this decision. WAVE specifications do not prohibit it from routing IPv6 traffic towards the destination addresses specified in the datagram headers and there are no provisions within WAVE for the RSU to block this traffic. It follows that a mechanism is required that enables the AAA server 40 to cause IPv6 traffic originating from a specific OBU to be filtered and, conversely, to cause the removal of a filter that has been applied to a specific OBU once it has been authenticated and authorized.

Figure 5:
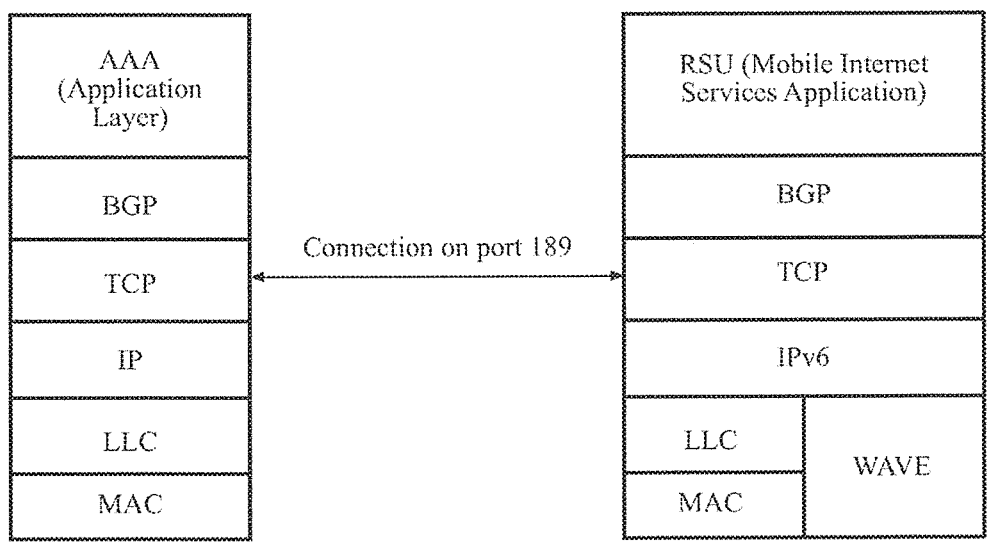
FIG. 5 is a block diagram illustrating a protocol stack above Wireless Access Vehicular Environment utilizing a Border Gateway Protocol.

The preferred methodology for such a mechanism is one which can be implemented in an RSU certified to comply with USDOT recommendations, which implies that the protocol stack above WAVE, illustrated in FIG. 5, is fully implemented. A filtering mechanism operates as application layer software using an API provided by the RSU vendor which exposes the transport layer of the protocol stack. The requirement for a router to discard traffic, based on the point of origin of the traffic, arises in the case of Denial of Service (DOS) attacks. One of the methods used by ISPs to protect against these attacks is called Remote Triggered Black Hole (RTBH) filtering. RTBH filtering can be applied to both source and destination addresses but in the specific case of DOS, the filtering is applied to the source address. This methodology is described in the informational RFC 5635, incorporated herein by reference, which specifies the use of internal Border Gateway Protocol to deliver RTBH filtering instructions to a router. Border Gateway Protocol as specified in RFC 4271, incorporated herein by reference, operates as a peer-to-peer session over a TCP connection on a well-known port (179), allowing for the propagation of routing information between pairs of routers.

Figure 8:
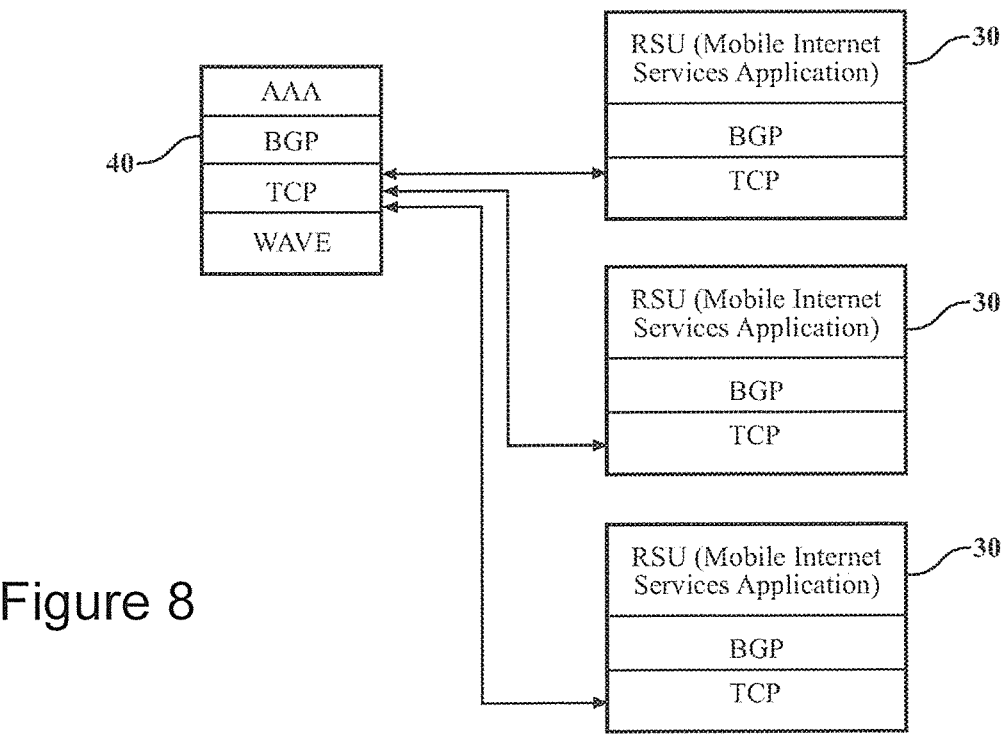
FIG. 8 is a system block diagram illustrating communication between an AAA server and a plurality of Roadside Units.
Figure 10:
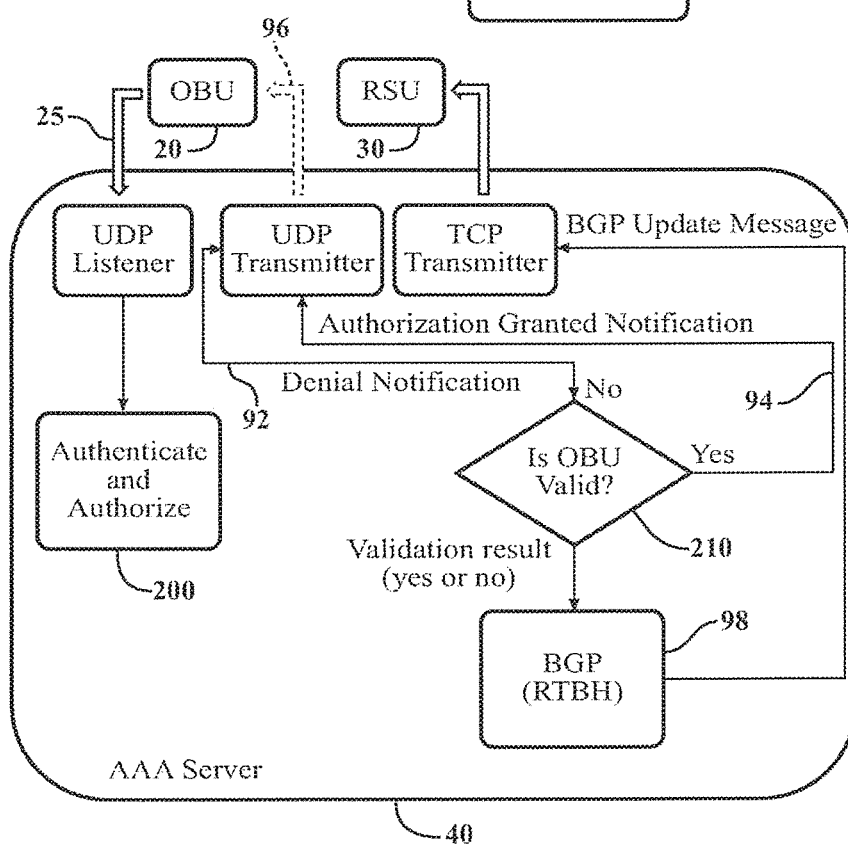
FIG. 10 is a system block diagram and flowchart illustrating a blocking and an unblocking of a client device, such as an On-board Unit, at a AAA server.

An infrastructure operator would normally have a plurality of RSUs and a very limited number, if not a single, AAA server, all operating within the same Autonomous System. This topology is illustrated in FIG. 8, where the AAA server 40 executes multiple instances of the BGP Finite State Machine defined in RFC 4271, each with a TCP connection to an individual RSU 30. As shown in FIG. 10, the RTBH filtering instructions are sent as UPDATE messages, which are defined in RFC 4271 and which specify the addresses to be blocked (filtered) or unblocked by the receiving RSU 30.

FIG. 5 illustrates use of BGP by a software application, in contrast to the more conventional scenario in which the BGP services are invoked by a network administrator through a command line interface. In other words, the use of BGP in the context of this disclosure is a completely automated process, defined by the flow chart in FIG. 10, which can be described in terms of the following algorithmic steps:

An authorization request 25 from an OBU 20 is received by the AAA server 40.

Authentication and authorization are carried out in step 200 according to the mechanisms already described in the present disclosure.

In step 210, the request is validated. If the request is invalidated (either because authentication fails or authorization is not granted), a "denial notification" can be returned to the OBU in the form of UDP message 92.

If the request is authorized, a "grant notification" 94 can be returned to the OBU.

In both cases of the preceding cases, a response 96 to the OBU is shown as a dotted line to signify that it is optional. The request for authorization is not part of the WAVE standard and therefore, as previously indicated, the OBU is neither obligated to send this request nor to listen for, or take any action with respect to, a response. Hence implementation of the response message in the AAA Server is not a requirement.

In both cases, the result of the authentication/authorization process becomes an input 98 to the invocation of the BGP service that sends an UPDATE message to the RSU through which the OBU request was routed to the AAA Server. Depending on the result, this message will instruct the peer BGP entity running in the RSU to either block or unblock traffic originating from the requesting OBU. The TCP connection is chosen according to the IPv6 address of the RSU, which is obtained by parsing the global prefix and subnet ID from the IPv6 address of the OBU (see RFC 4291 IP Version 6 Addressing Architecture, incorporated herein by reference).

An alternative methodology for instructing the RSU block mobile-terminated traffic to a specified mobile destination address would be to send an SNMP SET command instructing the RSU to set to either TRUE or FALSE the MIB object ipv6RouteValid corresponding to the ipv6RouteTable entry for the specified mobile destination address. This approach would not be applicable to blocking (or unblocking) the routing of mobile-originated traffic.

Figure 11:
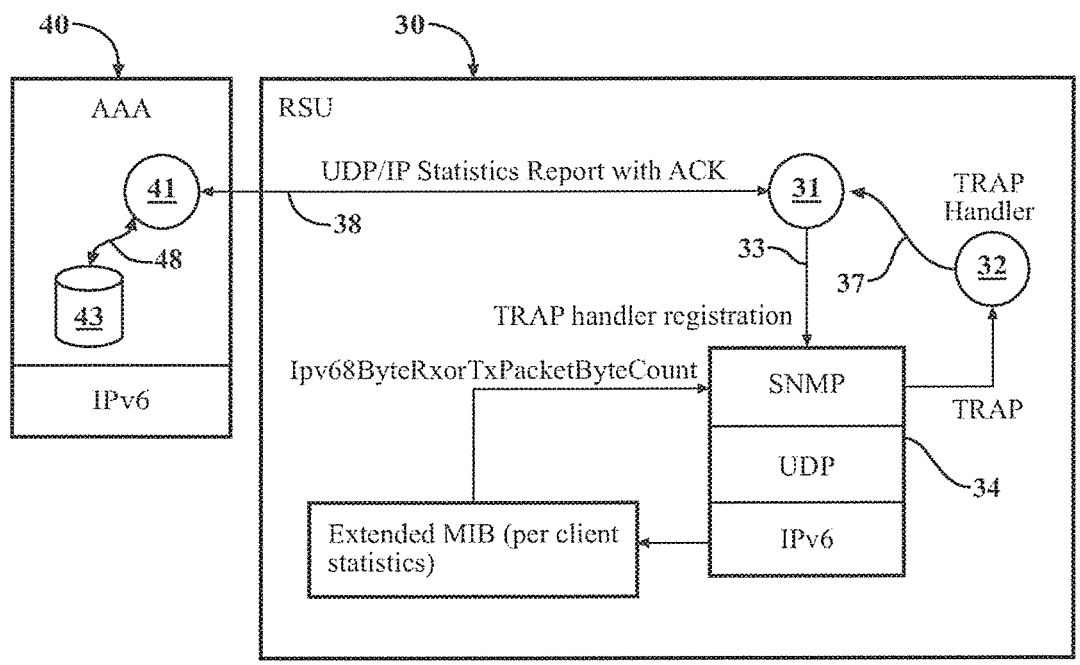
FIG. 11 is a system block diagram and flowchart illustrating an accounting process according to the subject invention.

The last aspect of the subject invention is Accounting. Since one goal of the subject invention is the monetization of radio spectrum, the RSU, in some exemplary embodiments, is configured to keep track of the service channel bandwidth consumption by each device, when using the IPv6 interface, and periodically send reports to the AAA server. To accomplish this, the Management Information Base (MIB) of the IPv6 layer is extended to acquire packet and byte count statistics per client, the data is retrieved using a standard SNMP interface and periodically transmitted to the AAA server, in some exemplary embodiments through a TCP connection. The preferred implementation is illustrated in FIG. 11. Process 31 running in the RSU invokes the TRAP handler registration 33 to register TRAP handler 32 with the SNMP, so that per client byte count statistics are reported asynchronously. Whenever a packet is sent to, or received from, the WAVE IPv6 interface, the extended MIB provides the statistics on per client basis (Ipv6ByteRxorTxPacketByteCount), which generates TRAP message 34. TRAP handler 32 processes the TRAP and informs process 31 using a callback procedure 37. Process 31 accumulates the per client statistic in a NOVRAM table and periodically sends a UDP/IP report (message 38) to the AAA server which is persistent (i.e. requiring an acknowledgement). Before sending the acknowledgement, process 41 running in AAA server 40 invokes the database procedures 43 in order to store the information received in the report.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the scope of the appended claims. The scope of the following claims is to be accorded the broadest interpretation so as to encompass all such modifications and equivalent structures and functions.

The following references are herein incorporated by reference:

WAVE: IEEE WIRELESS ACCESS IN VEHICULAR ENVIRONMENTS (WAVE)—IEEE 1609 SERIES, available at http://www.techstreet.com/standards/ieee-wireless-access-in-vehicular-environments-wave-ieee-1609-series?sid=goog&gclid=Clbc_ZfFxs0CFQ6na QodjolKlg&product_id=1893147.

IEEE 802.11p: IEEE STANDARD 802.11p-2010—IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, available at: https://standards.ieee.org/findstds/standard/802.11p-2010.html U.S. patent application Ser. No. 14/151,035, available at http://www.google.com/patents/US20140195102

SCMS Vehicle-to-Vehicle Security Credential Management System; Request for Information, A Notice by the National Highway Traffic Safety Administration on Oct. 15, 2014, available at http://federalregister.gov/a/2014-24482

Request For Comments (RFC) 4861 (Neighbor Discovery for IPv6) September 2007, available at https://tools.ietf.org/html/rfc4861

RFC 4862 (Stateless Address Autoconfiguration) September 2007, available at https://tools.ietf.org/html/rfc4862

RFC 6275 (Mobility Support in IPv6) July 2011, available at https://tools.ietf.org/html/rfc6275

RFC 5635 (Remote Triggered Black Hole Filtering) August 2009, available at https://tools.ietf.org/html/rfc5635

RFC 4271 (Border Gateway Protocol 4) January 2006, available at https://tools.ietf.org/html/rfc4271

RFC 4291 (IPv6 Addressing Architecture) February 2006, available at https://tools.ietf.org/html/rfc4291

V2V Readiness Report DOT HS 812 014 August 2014. Vehicle-to-Vehicle Communications: Readiness of V2V Technology for Application, available at http://docplayer.net/13180-Dot-hs-812-014-august-2014-vehicle-to-vehicle-communications-readiness-of-v2v-technology-for-application.html All U.S. patents and patent applications discussed above, as well as all articles, documents, papers, specifications, etc., referenced above are hereby incorporated by reference herein.

What is claimed is:

1. An On-Board Unit (OBU), compliant with Wireless Access Vehicular Environment (WAVE) and configurable with dual-radio capability, running at least one application level computer program adapted to request authentication and authorization from an Authentication, Authorization and Accounting (AAA) server, for IPv6 connectivity to the Internet, either on behalf of a neighboring non-Dedicated Short-Range Communications (DSRC) mobile device or for a DSRC, and configured with an extended IPv6 Management Information Base (MIB) operable to retrieve addresses of neighboring devices when a new entry is inserted in a routing table, using either a synchronous method based on SNMP GET to retrieve the routing table periodically, or an asynchronous method based on SNMP TRAP to report "real-time" changes in the routing table.

2. The OBU as defined in claim 1, operable to request "Internet Subscription" credentials from the AAA server, using a Security Credentials and Management System (SCMS) enrollment certificate from encryption of the request to, and decryption of a response from, said AAA server, and operable to use said credentials when requesting authentication and authorization from said AAA server for said IPv6 connectivity to the Internet.

3. The OBU as defined in claim 1, operable to request credentials from the AAA server, using SCMS enrollment certificate, an identification certificate, or other certifying credential, to digitally sign the request to said AAA server, said request including a public key of said enrollment certificate, which enables said AAA server to encrypt a response, and operable to use said credentials when requesting authentication and authorization from said AAA server for said IPv6 connectivity to the Internet.

* * * * *